United States Patent [19]

Holt et al.

[11] Patent Number: 4,806,065
[45] Date of Patent: Feb. 21, 1989

[54] TRAILER

[75] Inventors: Joseph C. Holt, Veedersburg; Russell L. Losh, Rensselaer, both of Ind.

[73] Assignee: Talbert Manufacturing, Inc., Rensselaer, Ind.

[21] Appl. No.: 2,141

[22] Filed: Jan. 12, 1987

Related U.S. Application Data

[63] Continuation-in-part of Ser. No. 759,598, Jul. 26, 1985, Pat. No. 4,635,997, which is a continuation-in-part of Ser. No. 637,958, Aug. 6, 1984, Pat. No. 4,580,830.

[51] Int. Cl.$^4$ .............................................. B62D 27/02
[52] U.S. Cl. .................................... 414/481; 414/495; 414/458; 187/2; 280/441.2; 280/425.2; 296/182
[58] Field of Search ............. 414/495, 481, 458, 459, 414/482, 483, 608; 280/423 B, 425 A; 187/2

[56] References Cited

U.S. PATENT DOCUMENTS

| | | |
|---|---|---|
| 2,653,827 | 9/1953 | Manning . |
| 2,687,225 | 8/1954 | Martin . |
| 2,776,146 | 1/1957 | Marino . |
| 2,827,190 | 3/1958 | Spitzmesser ..................... 414/608 |
| 3,088,545 | 5/1963 | Meyer ............................... 187/2 X |
| 3,095,987 | 7/1963 | Sable ............................. 414/495 X |
| 3,215,449 | 11/1965 | Talbert ........................ 414/481 X |
| 3,448,878 | 6/1969 | Schindler .......................... 414/495 |
| 3,578,356 | 5/1971 | Moiriat ........................ 280/425 A |
| 3,730,366 | 5/1973 | Berends ............................. 414/495 |
| 4,262,923 | 4/1981 | Weir ............................. 280/423 B |
| 4,290,642 | 9/1981 | Wise . |
| 4,302,022 | 11/1981 | Schoeffler et al. . |
| 4,580,830 | 4/1986 | Holt et al. . |
| 4,635,997 | 1/1987 | Holt et al. . |

*Primary Examiner*—Frank E. Werner
*Attorney, Agent, or Firm*—Barnes & Thornburg

[57] ABSTRACT

A trailer is disclosed having a forward section, a middle section, and a rearward section. The forward section is adapted to be attached to the fifth wheel of a tractor while the rearward section supports the trailer on a set of wheels. The middle section extending between the forward and rearward sections is positionable in at least two load-transporting positions at different heights above the ground. The forward and rearward sections each include fixed support elements and locking pins for securing the middle section to the fixed support elements at each of the load-transporting positions. Rollers are provided to guide the movement of the middle section between the load-transporting positions, at least some of the rollers being easily removed to permit front loading of the middle section. An air bag jack is included to move the front end of the middle between the lower-most load transporting position and a ground contacting front loading position.

26 Claims, 4 Drawing Sheets

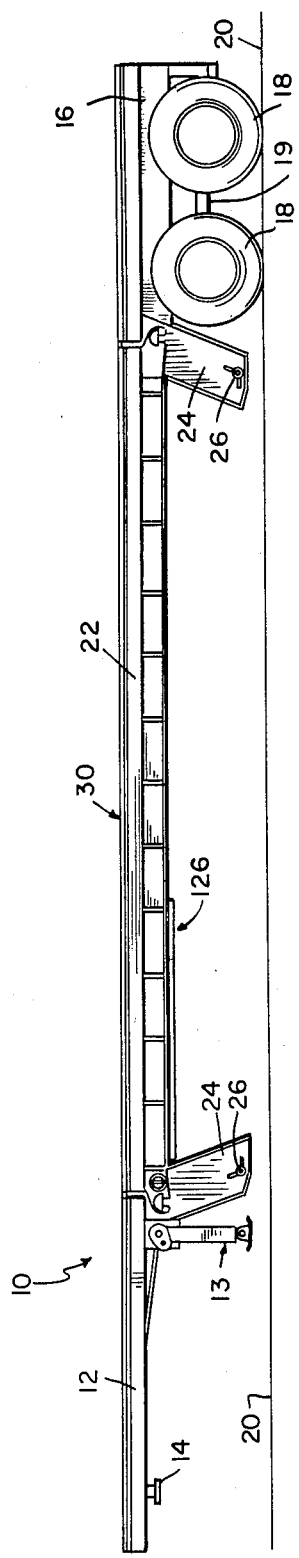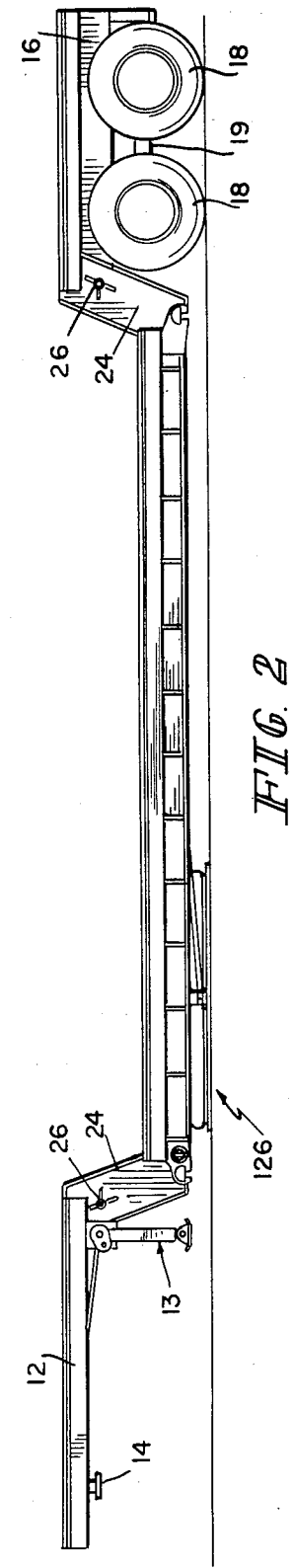

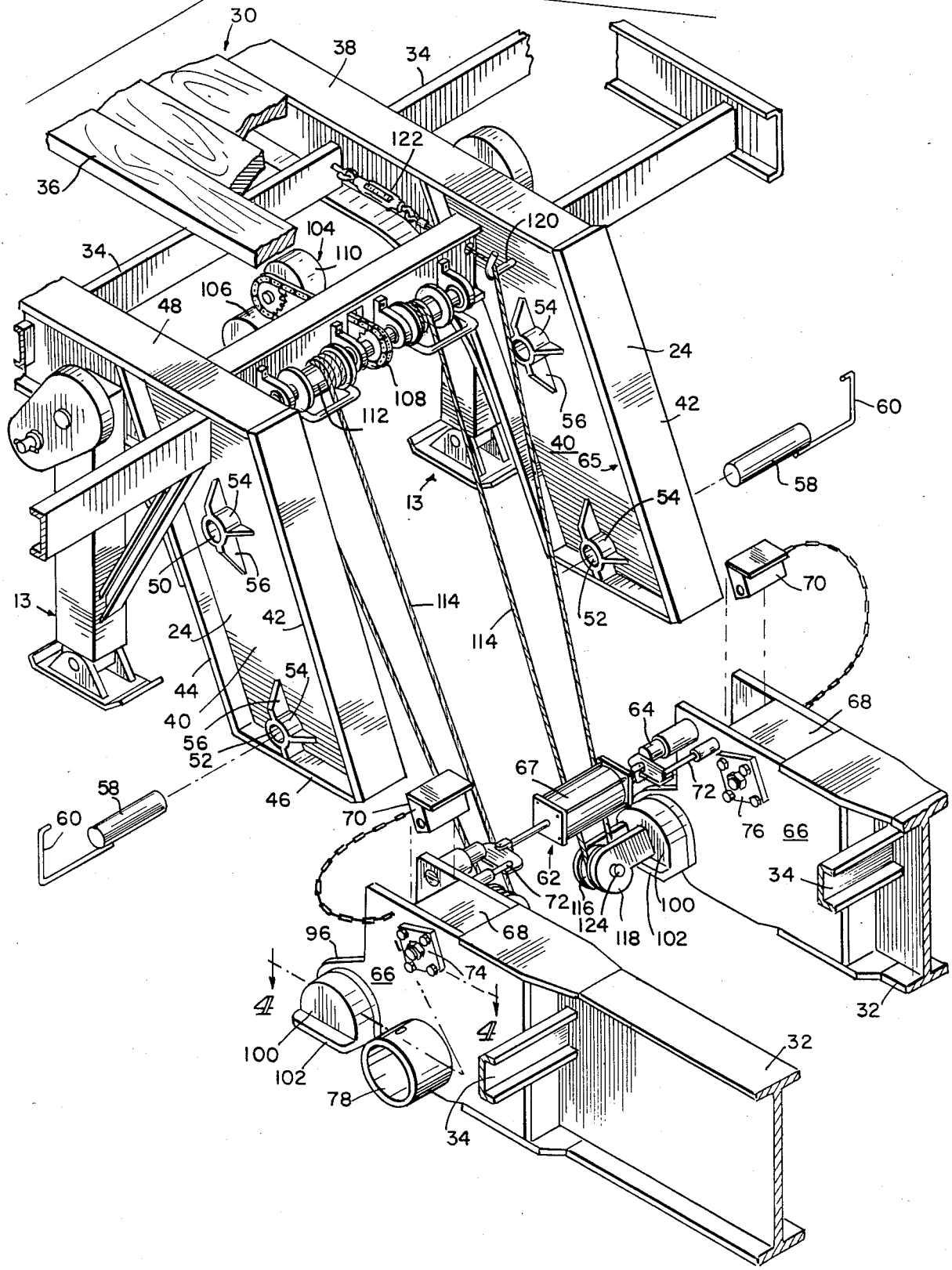

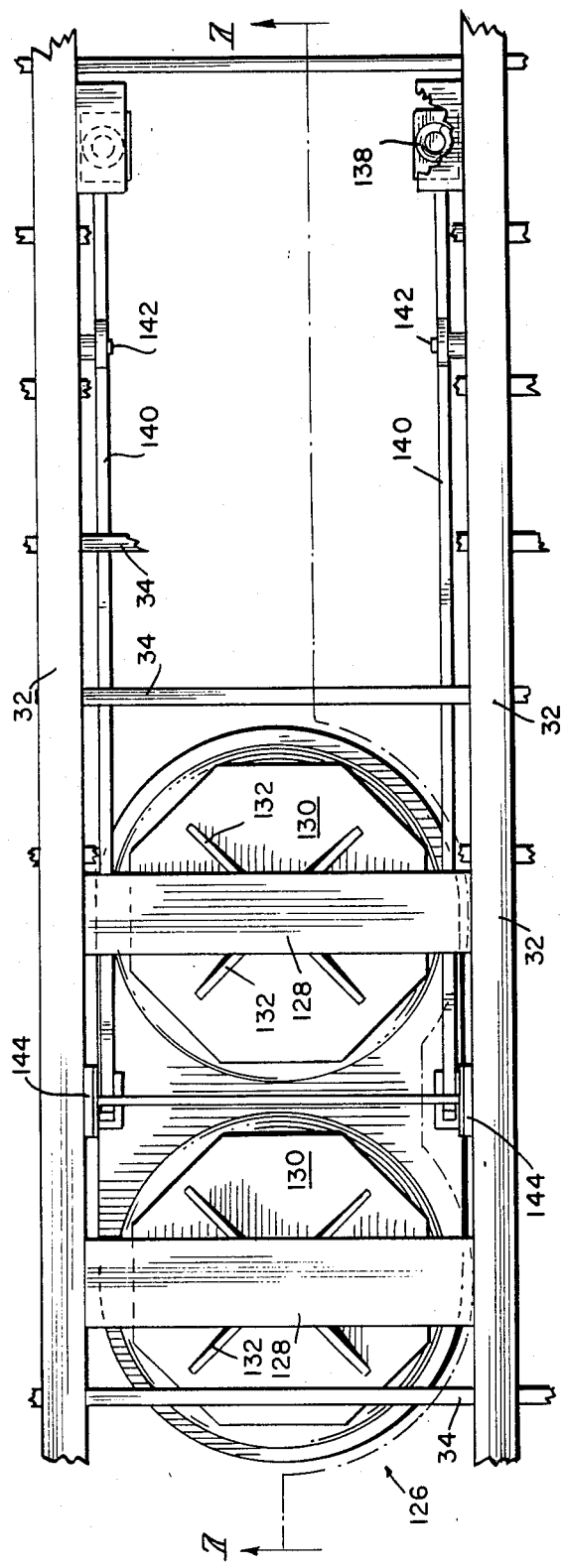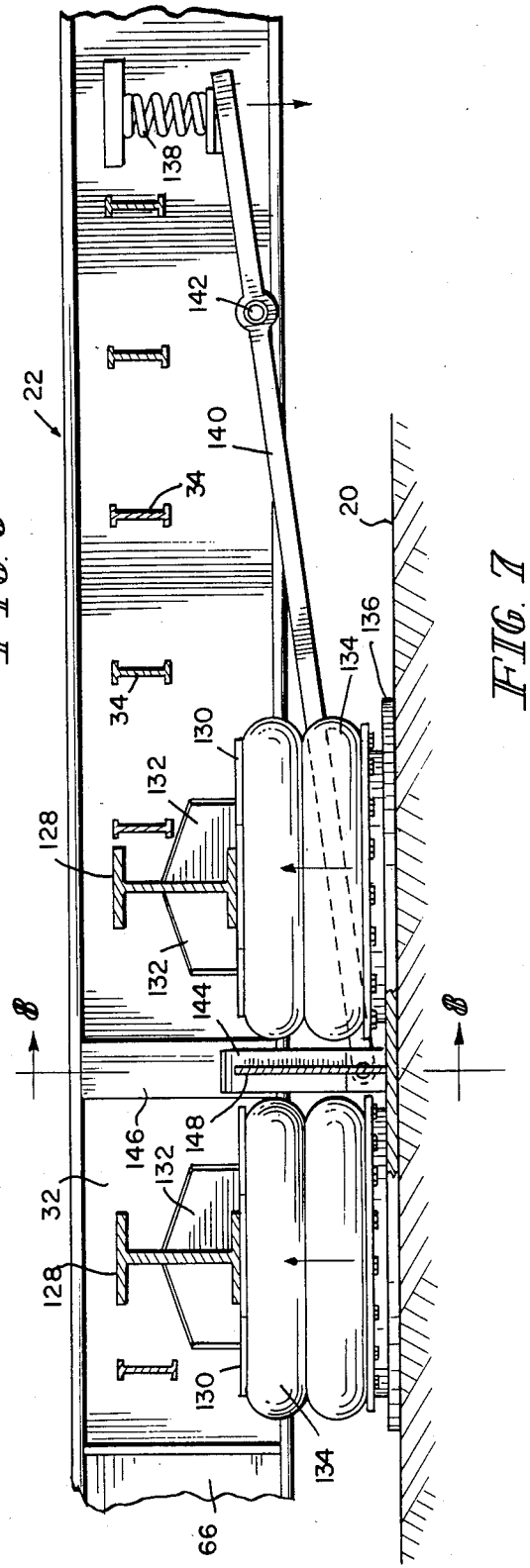

TRAILER

This application is a continuation-in-part of our earlier application serial number 759,598 filed July 26, 1985 now U.S. Pat. No. 4,635,997 which is in turn a continuation-in-part of serial number 637,958 filed Aug. 6, 1984, now U.S. Pat. No. 4,580,830.

The Present invention relates generally to the field of wheeled land vehicles and in particular to cargo-carrying trailers designed to be removably attached to a fifth wheel of a tractor or cab. The invention is particularly directed to such a trailer which includes means for positioning the cargo-carrying surface of the trailer in at least two load-transporting positions at different heights above the ground.

Trailers are conventionally classified into one of several categories based principally on their physical construction and the relationship of that construction to its load-carrying capabilities. Examples of types of trailers are tank trailers for carrying liquid materials, bulk commodity trailers generally of the hopper type, pole or logging trailers, dump trailers, automobile transport trailers, etc. Of particular interest to the present invention are platform or flatbed trailers and lowbed or drop-deck trailers. A flatbed or platform type trailer has a deck or load-carrying surface which is at a fixed height along the entire length of the trailer, that height typically being about 4.5 feet (1.4 meters) above the road surface. Such trailers are well adapted for hauling a wide variety of loads, particularly loads which are able to withstand weather, may be long and rather low such as pipe, drill casing, etc. On the other hand, a flatbed type trailer cannot haul an overly high load due to the lack of clearance presented by overpasses, bridges, and the like.

When one is faced with transporting a tall load, one typically employs a lowbed or drop-deck trailer. A lowbed trailer generally has a forward section which is at the normal height of the flatbed trailer but has a center section between the forward section and the rear wheels which is significantly lower, generally only about 2 feet (0.6 meters) above the road surface. This lowbed trailer can easily haul tall or high loads which could not be transported on flatbed trailers. On the other hand, such a lowbed trailer is generally thought to be unsatisfactory for many loads which are long and which require support along their entire length so as to avoid deformation of the load under its own weight. Thus, it may be seen that both flatbed type and lowbed type trailers have unique advantages which permit the use of one type of trailer in situations where use of the other type of trailer is inadvisable or impossible.

A particular problem is encountered when one selects either a flatbed or lowbed trailer to haul a particular load from a first location to a second location many hundreds or thousands of miles away. Once the trailer has been selected, and the load delivered, it is then necessary that the driver either locate another suitable load for the trailer for the return trip, which is often difficult and time-consuming, or return empty. This returning empty or deadheading is costly, totally unproductive, and to be avoided if at all possible. The situation could be avoided if one had a trailer having a load carrying surface which was movable between the lowbed and flatbed positions so as to adjust its suitability for various types of loads.

One such trailer is disclosed in Schoeffler et al U.S. Pat. No. 4,302,022. The Schoeffler trailer has a front section of the usual height adapted to connect with a tractor in the usual fashion. A rear section is provided which can be moved relative to the forward section and moved on a linkage mechanism relative to the supporting rear wheels. The Schoeffler design requires the rear wheels be provided with an extremely low carriage structure so an to permit the rear portion of the trailer to be lowered to the lowbed position. In practice, such a small carriage structure is neither practical nor suitable for carrying the heavy loads typically carried by such trailers.

Another such trailer is disclosed in Wise U.S. Pat. No. 4,290,642. The Wise trailer includes a center section which is movable between a lower and upper position only after the front and rear end sections have been totally, longitudinally removed from the center section. The center section height is then changed by jacks or other external equipment to the new position. The end sections are thereafter longitudinally displaced back into supporting relation and joined to the center section by appropriate fasteners. The alignment problems presented by such independent movement of the three disconnected sections of the trailer make its use difficult in the best of situations and impossible in other situations.

Yet another such trailer is disclosed in Martin U.S. Pat. No. 2,687,225. The Martin trailer has both front and rear sections linked to a center section in a manner similar to that shown in Schoeffler et al. Additionally, the front and center sections can be removed from a tractor in such a way as to provide a front-loading configuration for heavy equipment. This front-loading feature has been used in drop-deck trailers for many years and the many advantages of such goose-neck trailers are well known. An example of such a trailer is found in Talbert U.S. Pat. No. 3,536,340.

An object of the present invention is to provide a trailer which includes means for positioning the cargo-carrying surface of the trailer in at least two load-transporting positions and incorporates means permitting the front loading of the center section of the trailer when the center section is lowered to or below the lowermost load-transporting position.

A trailer in accordance with the present invention includes a forward section having a kingpin for attachment to the fifth wheel of a tractor in the conventional fashion. A rearward section is provided which includes a set of wheels for supporting the trailer on the ground, the rearward section having little or no vertical movability. A middle section is provided which extends between the forward and rearward sections and is positionable in at least two load-transporting positions at different heights above the ground. At the uppermost position, the middle section is preferably situated so as to form a flatbed trailer while at its lowermost position the middle section is at the conventional height of a lowbed trailer. The forward and rearward sections of the trailer in accordance with the present invention each include fixed, typically oblique, support elements. The trailer includes a locking mechanism for securing the middle section to the fixed support elements at each of the load-transporting positions. Means is provided for guiding the middle section as it is moved between positions such that the three sections of the trailer are maintained substantially parallel to each other. A power mechanism is provided for moving the middle section between the various load-transporting positions.

Generally, the fixed support elements on the forward and rearward sections are provided as end structures to the longitudinal support beams of each section. Longitudinal support beams of the middle section are adapted to contact the support elements and engage the same in the load-transporting positions. Generally, the power mechanism provided for moving the middle section relative to the two end sections is not relied upon to support the load but rather the load is supported in the various positions by the locking mechanism locking the middle section to the two end sections. This has the advantage of permitting the inclusion of smaller power elements which need only to be large enough to move the weight of the middle section itself rather than support the heavy loads typically carried by such a trailer. When the locking means is in position, the beam structure of the trailer is essentially similar to conventional trailers in having the usual structure of either a flatbed or lowbed trailer. This has the advantage also of permitting the trailer to carry loads of various sizes and weights fully equivalent with both the conventional flatbed and lowbed type trailers.

The front loading feature of the present invention is achieved by providing means for withdrawing the guide means normally coupling the middle section to the support elements so as to permit separation of the forward and middle sections. The power means used to move the middle section between the various load-transporting positions is also adapted to be uncoupled. A separate jacking means can be provided for moving the forward end of the middle section between the lowermost load-transporting position and a ground-engaging front loading position.

Additional features and advantages of the invention will become apparent to those skilled in the art upon consideration of the following detailed description of preferred embodiments exemplifying the best mode of carrying out the invention as presently perceived. The detailed description particularly refers to the accompanying figures.

FIG. 1 is a side elevation view of a trailer embodying the present invention showing it in its upper or flatbed configuration.

FIG. 2 is a side elevation of the same trailer shown in FIG. 1 but situated in its lower or lowbed configuration.

FIG. 3 is an exploded perspective view of the trailer showing the relation between the middle section and the front end section.

FIG. 6 is a top plan view of a forward portion of the middle section of the trailer partly broken away and with the decks removed.

FIG. 7 is a sectional detail view taken from FIG. 6 along line 7—7.

Figure 4:
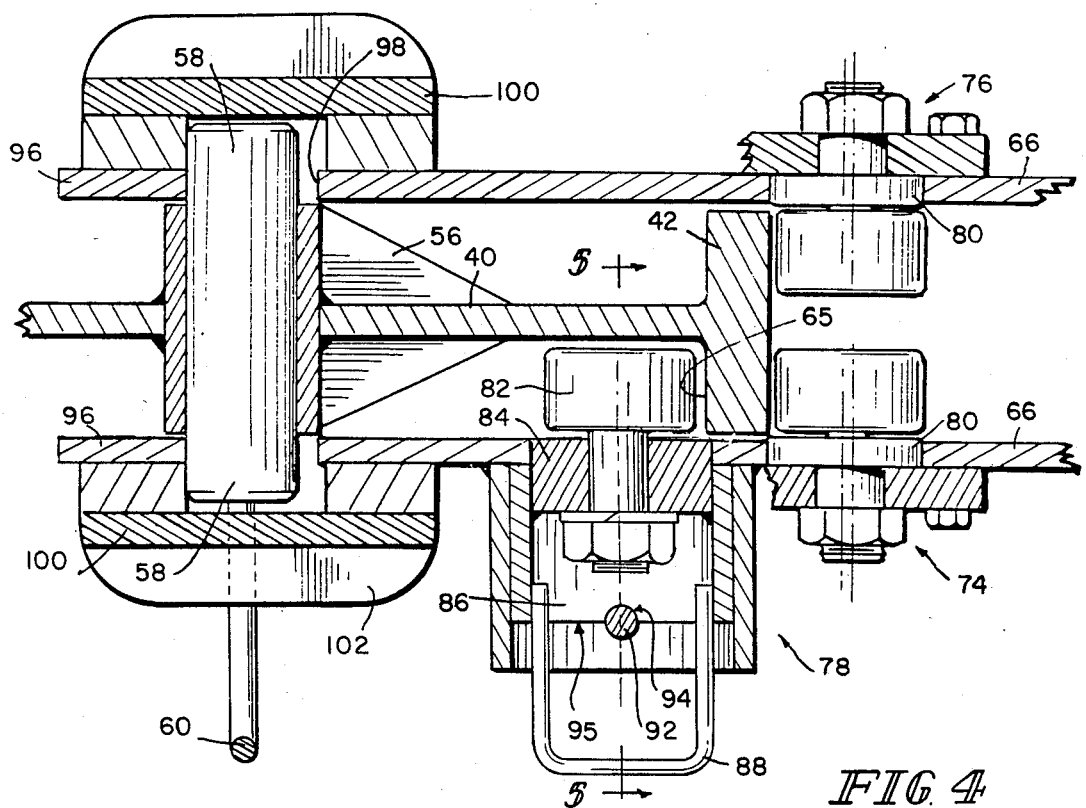
FIG. 4 is a sectional detail view taken from FIG. 3 along line 4—4.

In accordance with the present invention, a trailer 10 includes a forward section 12 having a kingpin 14 which permits attachment of the forward section 12 to the fifth wheel of a conventional tractor (not illustrated) and a landing gear 13 for supporting the forward end of the trailer in the absence of a tractor. A rearward section 16 is provided which includes a set of wheels 18 for supporting the trailer on the ground. The wheels 18 and related carriage structure 19 are preferably of a size and weight suitable for carrying heavy loads of from ten to forty tons. The rear wheels 18 support the trailer with respect to the ground 20 such that the top or deck 30 of the forward section 12 and rearward section 16 are at substantially the same height, typically 4.5 feet (1.4 meters) above the ground 20.

Figure 8:
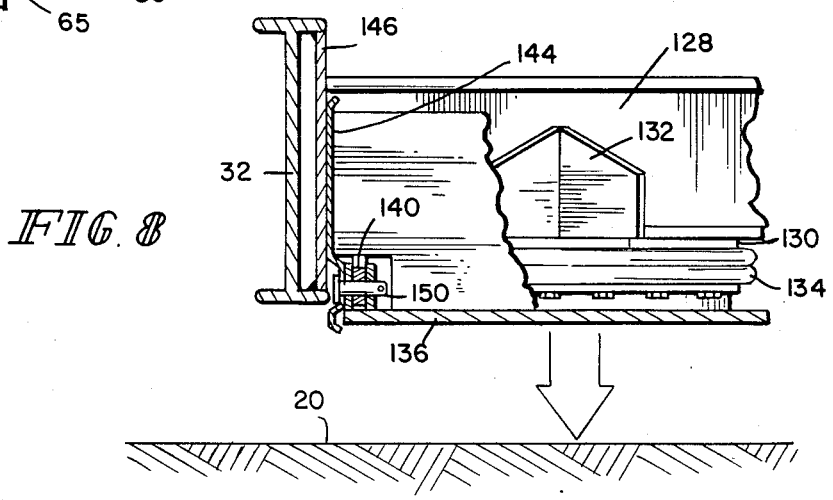
FIG. 8 is a sectional detail view taken from FIG. 7 along line 8—8.

The trailer also includes a middle section 22 which extends between the forward section 12 and rearward section 16. The middle section 22 is positionable in at least two load-transporting positions at different heights above the ground 20. The middle section 22 is shown in FIG. 1 at an uppermost position so as to form the functional equivalent of a conventional flatbed or platform trailer. The middle section 22 is shown in FIG. 2 in a lowermost load-transporting position functionally equivalent with a conventional lowbed or drop-deck trailer. An integral jacking means 126 is shown in an expanded position in FIG. 2 and will be discussed further in connection with FIGS. 6, 7 and 8.

Support elements 24 are fixed to both the forward section 12 and the rearward section 16 and act to support the middle section 22. Locking means 26 such as pins are provided for securing the middle section 22 to the fixed support elements 24 at each of the load-transporting positions. A power means 104 shown in FIG. 3 is provided for moving the middle section 22 between the various load-transporting positions while the locking means is disengaged.

As shown best in FIG. 3, the middle section 22 includes a pair of longitudinal support beams 32 which are substantially aligned with the support elements 24 provided on each end section 12 and 16. A plurality of smaller transverse beams 34 are provided which provide support for a top surface or deck 30. The top surface is shown in FIG. 3 to comprise a plurality of wood planks 36 but other suitable materials may be employed. Additional surface elements can be provided for closing any open areas between the sections when the middle section 22 is not in the upper position shown in FIG. 1. The end sections 12 and 16 also include longitudinal support beams 38 to which the oblique support elements 24 are fixed. Only the forward end section 12 is shown in FIG. 3 however the rearward section 16 can be of similar construction. If desired, other constructions can be used for the forward and rearward sections such as those illustrated in our earlier application, serial number 759,598 filed July 26, 1985, which is hereby incorporated by reference.

As shown in FIG. 3, the oblique support elements 24 on each of the end units includes a web 40 spanning between a center-facing flange 42 and an end-facing flange 44 to form an I beam which extends longitudinally downward toward the middle section of the trailer. A lower end flange 46 is situated generally parallel to the ground while the top end flange 48 forms a continuation of the top surface of longitudinal support beam 38. The material forming the center-facing flange 42 is preferably selected to have a material thickness sufficient to serve in part as a wear surface during use.

The web 40 includes a plurality of apertures 50 and 52 into which cylindrical inserts 54 are fixed by welding or other appropriate means. One or more gussets 56 may be added to correctly position and strengthen the cylindrical inserts 54 with respect to the web 40. The cylindrical inserts 54 are adapted to receive supporting pin 58 for supporting the middle section. The supporting pin 58 includes a handle 60 to permit easy withdrawal and insertion of the pin in the apertures 50.

A locking means 62 is provided for locking the middle section 22 to each of the end units. The locking means comprises locking pins 64 which are adapted to connect the end of the middle unit 22 to the web side surface 64 of center-facing flange 42. The locking pins 64 are moved by means of an air or hydraulic cylinder 67.

The longitudinal support beams 32 of the middle section 22 include laterally displaced extensions 66 which straddle the support elements 24 of the end units. The laterally displaced extensions 66 are bridged on top by a thickened or reinforced plate segment 68 which is of a size to withstand the compression loads experienced by the end structure of the longitudinal beams 32. A shim means 70 is positionable between the plate segment 68 and the center-facing flange 42 to provide a wearing surface and to perform a spacing and cambering function. The shim means 70 is retained in position by shim keepers 72 also moved by cylinder 67.

The middle section 22 is linked to the end sections by roller assemblies 74, 76 and 78 which are adapted to contact the center-facing flange 42 during movement of the middle section 22 relative to the end sections 12, 16. The roller assemblies 74 and 76 are situated on both of the laterally displaced extensions 66 and are positioned with respect to flange 42 such that the roller assemblies 74 and 76 are contiguous to the middle section confronting surface of flange 42 as best shown in FIG. 4. The roller assemblies 74 and 76 are preferably constructed to include an eccentric mounting means such as collar 80 so that the position of the rollers can be adjusted relative to the surface of flange 42 of the support elements 24. The roller assemblies 74 and 76 are displaced in position by the shims 70 so as to provide the small amount of spacing shown in FIG. 4. This spacing is desired so that the trailer when loaded will not be supported on the roller assemblies.

Figure 5:
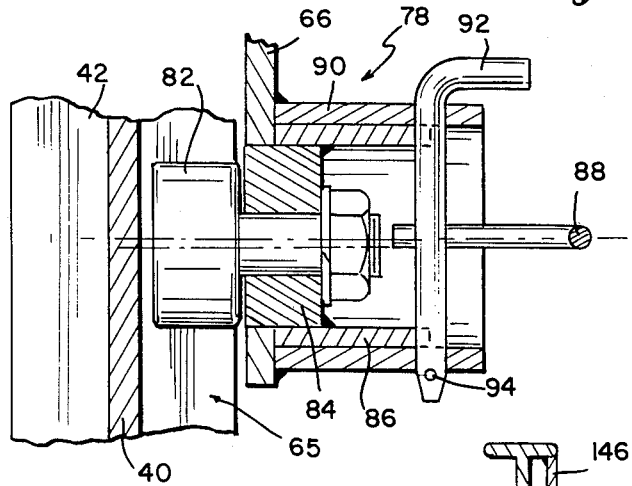
FIG. 5 is a sectional detail view taken from FIG. 4 along line 5—5.

The additional removable roller assemblies 78 are provided only in the outer displaced extension 66 of each longitudinal beam 32 of the center section 22. The removable roller assemblies 78 engage the web side surface 65 of the center-facing flange 42 as best shown in FIG. 4. The roller assembly 78 is removable to permit the center section 22 to be easily uncoupled from the front section 12 to permit front loading of heavy equipment or the like. The removable roller assembly 78 is shown in detail in FIGS. 4 and 5 to comprise a roller 82 mounted on an eccentric mounting collar 84. The collar is welded within a cylinder 86 which has a handle 88 on the end opposite the mounting collar 84. The cylinder 86 is received within a sleeve 90 which is fixed to outer displaced extension 66 of longitudinal beam 32. The sleeve 90 includes a pair of apertures generally on a diameter through which pin 92 passes. The pin 92 engages orientation slots 94 in the outer edge 95 of cylinder 86 to maintain the position and orientation of the cylinder 86 within the sleeve 90. The pin 92 can be held in place with a keeper passing through hole 94 in the lower end thereof.

The weight of the middle section 22 is transmitted to the support elements 24 by supporting pins 58 positioned in either the apertures 50 or 52. The supporting pins 58 are engaged by the end hook portions 96 of the laterally displaced extensions 66 each of which include a downward opening slot 98. It will be noted that the supporting pins 58 not only engage the downward opening 98 but are captured by end plates 100 which bridge the ends of each downward opening slot 98. The end plates 100 act to strengthen the hook portion 96. Additional strengthening is achieved by means of flanges 102 fixed to a lower edge of the end plates 100.

With the locking pins 64 withdrawn, the middle section 22 and end section are free to pivot about the supporting pins 58. The weight of the middle section 22 acting on supporting pins 58 causes the end section to pivot until the plate segment 68, shim means 70, and flange 42 of the support element 24 are in abutting relationship. The middle section 22 is secured in this position by energizing cylinder 67 to extend pin 64 behind flange 42 and engaging pin 72 into the shim means 70. The shim means 70 can be constructed of various thicknesses to provide additional spacing between the end of plate segment 68 and the flange 42. The additional spacing will act to introduce an additional longitudinal camber in the trailer. With the shim means 70 and supporting pins 58 withdrawn, the weight of the middle section is supported by roller assemblies 74, 76, and 78, and by power means 104.

The power means 104 is illustrated to be a motor 106 operating a chain drive 108 through reduction gear 110. The chain drive 108 rotates a pair of drums 112 around which cables 114 are wrapped. The cables extend from the drums 112, which are rotatably mounted to the front section, downward to and around pulleys 116 which are removably mounted on supports 118 fixed to end plates 100 of the inside lateral extension 66 of each longitudinal beam 32 of the middle section 22. The cables proceed upward from pulleys 116 over locating hooks 120 to turn buckles 122 which are used to adjust the length of the two cables 114 to be the same. Other power means can be used as disclosed in our earlier applications.

To change the middle section 22 from a lower position as shown in FIG. 2 to an upper position as shown in FIG. 1, the pin 64 is withdrawn by cylinder 67. A force is applied to the support element 24 by the landing gear 13, a jack or other means (not shown) so as to permit removal of shim 70. With the shim 70 removed, the roller assemblies 74, 76 and 78 are free to contact the flange 42. Power means 104 is then actuated causing the middle section to move upward guided along flange 42 by the roller assemblies 74, 76 and 78 so as to disengage the supporting pin 58 from the downwardly opening slot 98 in the end hook portion 96.

The power means 104 moves the middle section 22 directly up the supporting element 24 to a position slightly above that shown in FIG. 1. The supporting pin 58 is removed from the lower aperture 52 and installed in the upper aperture 50. The power means 104 is then actuated to permit the middle section 22 to lower to the point where the downwardly opening slot 98 of end hook portion 96 engages the supporting pin 58. The shims 70 are inserted and the power means is moved to a fully relaxed position so that all of the load of the middle section is assumed by the support pins 58 and shims 70. The locking pin 64 is then engaged behind flange 42 by energizing cylinder 67.

To move the middle section 22 from the upper position to the lower position, the procedure is merely reversed. While only two positions are illustrated in the embodiment shown in the drawings, it will be appreciated that any number of positions are possible.

To permit the front loading of the middle section 22, the power means 104 is operated similar to that previously discussed for raising the middle section above the lower-most position only to the point that the support pins 58 can be removed. The power means 104 is then permitted to lower the middle section 22 to the ground or onto a ground-engaging support means, not shown. The power means continues to unwrap cables 114 from drums 112 until the cables 114 are somewhat slack. Axle pins 124 are then removed from pulley supports 118 thereby allowing the cables 114 to be disengaged from the middle section 22. The front section can then be moved forward by the tractor a distance sufficient to permit front loading of the middle section.

As indicated previously, the power means 104 is generally not of sufficient size to raise or lower the middle section 22 when the middle section is fully loaded. Such raising or lowering can be achieved by other means such as portable jacks, etc. A particularly convenient means for raising and lowering the middle section 22 when fully loaded is disclosed in FIGS. 6, 7 and 8. The middle section jacking means 126 is shown in a top plan view in FIG. 6 which shows a front portion of the middle section 22 with the deck 30 removed to expose the longitudinal beams 32 and smaller transverse beams 34. A pair of larger transverse beams 128 are shown to be fixed between the longitudinal beams 32. A pair of octagonal plates 130 are fixed to a lower surface of the transverse beams 128 with the aid of gussets 132. A pair of air bags 134 are positioned below the plates 130 as best seen in FIG. 7. A foot plate 136 is positioned below the air bags 134 and is shown in FIG. 7 to be in contact with the ground 20.

The air bags 134 can be connected to a source of compressed air to be expanded to the position shown in FIG. 7, or even further. The expansion of the air bags causes the middle section 22 to move upward with respect to the ground 20. When the air is released from the air bags 134, the air bags are compressed by a biasing means such as coil springs 138 acting through lever arms 140 around pivot pins 142. The upward movement of the foot plate 136 is guided by guide members 144 sliding upward against guide plates 146 to the position shown in FIG. 8. The guide members 144 are tied together by plate member 148 which acts to laterally stabilize the vertical movement of the foot 136. Longitudinal stabilization of the vertical movement of the foot is provided by lever arms 140 pivoting on pivot pins 150.

Although the invention has been described in detail with reference to certain preferred embodiments, variations and modifications exist within the scope and spirit of the invention as described and as defined in the following claims.

What is claimed is:

1. A trailer for use on a road or other underlying surface, the trailer comprising a frame including a forward section and a rearward section laterally spaced apart from the forward section, a middle section received between the forward and rearward sections, the middle section having at least a first position elevated above the underlying surface and a second position elevated above the first position, support elements fixed to and extending downward from the forward and rearward sections for supporting the middle section at the prescribed positions, locking means for locking the middle section to the support elements at the prescribed positions, roller means for guiding the middle section from one of the positions to another of the positions linearly along the support elements, the roller means comprising a plurality of roller assemblies on the middle section engaging both forward and rearward facing surfaces of the support elements on at least the forward section, the roller assemblies engaging the forward facing surface of the support elements on the forward section comprising a cylinder axially movable with respect to the middle section, an end plate fixed to one end of the cylinder, an axle unit coupled to the end plate, a roller coupled to the axle unit outside of said one end of the cylinder, and position maintaining means removably coupling the cylinder to the middle section to engage the roller with one forward facing surface of the supporting elements of the forward section, the position maintaining means being at least partially removable to permit the separation of the forward section from the middle section and allow front loading of the trailer middle section.

2. The trailer of claim 1 further comprising power means for moving the middle section between said first and second positions.

3. The trailer of claim 2 wherein the forward and rearward sections each include a pair of spaced parallel support elements, the power means being situated on the forward and rearward sections between the support elements thereof.

4. The trailer of claim 2 wherein the power means comprises cables, power means for varying the length of the cables, and pulley means on either end of the middle section engaging intermediate portions of the cables.

5. The trailer of claim 4 wherein the pulley means on a forward end of the middle section is disengagable from the middle section to permit front loading of the trailer middle section.

6. The trailer of claim 2 further comprising jacking means for moving the middle section between said first position and a position where at least the forward end of the middle section is in contact with the underlying surface.

7. The trailer of claim 6 wherein the jacking means comprises air bags positioned beneath the forward end of the middle section.

8. The trailer of claim 7 wherein the jacking means further comprises a foot positioned below the air bags for contacting the underlying surface and guide means for guiding the vertical movement of the foot.

9. The trailer of claim 8 wherein the jacking means further comprises biasing means for biasing the air bags toward a deflated position.

10. The trailer of claim 1 wherein the roller assemblies comprise eccentric means for adjustably positioning the rollers relative to the support elements on both the forward and rearward sections.

11. The trailer of claim 10 wherein the position maintaining means include means for maintaining the orientation of the eccentric upon replacement of the roller assemblies.

12. The trailer of claim 1 wherein the position maintaining means comprises a slot in the cylinder, a sleeve receiving the cylinder, a hole in the sleeve, and a pin means engaging the hole and slot.

13. The trailer of claim of 12 wherein the position maintaining means comprises a pair of slots on the end of the cylinder opposite the end plate, a pair of holes in the sleeve for receiving the pin means so as to engage the pair of slots, and a shoulder on an inner end of the sleeve against which said one end of the cylinder abuts.

14. The trailer of claim 1 further comprising handle means coupled to the roller supporting means for facilitating removal of the roller assembly from the middle section.

15. The trailer of claim 14 wherein the handle means comprises a generally U-shaped member having two legs joined by a bight, the two legs being fixed to an inner surface of the cylinder so as to permit the bight to project outside of an end of the cylinder opposite said one end.

16. A trailer of comprising a forward section including a kingpin for attachment to a fifth wheel of a tractor, a rearward section including a set of wheels for supporting the trailer on the ground, and a middle section extending between the forward and rearward sections and positionable in at least two load-transporting positions at different heights above the ground, the forward and rearward sections each including fixed support elements extending downward adjacent the middle section, each support element having a flange confronting the middle section including a forward-facing surface and a rearward-facing surface, roller means on the middle section engaging both the forward- and rearward- facing surfaces of the support elements for guiding the middle section during movement between the load-transporting positions, power means for moving the middle section between the load-transporting positions, securing means for securing the middle section at each of the load-transporting positions, and means on at least the forward end of the middle section for withdrawing at least a portion of the roller means to permit the separation of the middle section from the adjacent section and allow direct loading of the middle section, said portion of the roller means comprising a plurality of roller assemblies on the middle section engaging the forward facing surfaces of the support elements on the forward section, the roller assemblies being axially removable, the withdrawing means comprising removable pin means holding the roller assemblies in fixed position to the middle section and handle means coupled to the roller assembly for manually handling the roller assembly upon removal of the pin means.

17. The trailer of the claim 16 wherein the power means comprises winching means situated on at least the forward section between the support elements thereof including a cable, the middle section of the trailer including pulley means engaging an intermediate portion of the cable.

18. The trailer of claim 17 wherein the pulley means includes axle pin means removable to permit front loading of the trailer middle section.

19. The trailer of claim 16 wherein the middle section further comprises jacking means for moving the middle section between the lowermost load-transporting position and a lower front loading position 20. The trailer of claim 19 wherein the jacking means comprises expandable air bags situated under the forward end of the middle section.

21. The trailer of claim 20 wherein the jacking means further comprises biasing means for biasing the air bags toward an unexpanded position.

22. The trailer of claim 20 wherein the acking means further comprises means for guiding the movement of a lowermost portion of the jacking means during expansion and contraction of the air bags.

23. The trailer of claim 16 wherein the removable roller assembly comprises a cylinder, and end plate fixed within one end of the cylinder, an axle unit coupled to the end plate, a roller coupled to the axle unit outside said one end of the cylinder, the handle means being fixed to the cylinder.

24. The trailer of claim 23 further comprising a sleeve fixed to the trailer middle section for receiving the cylinder, the sleeve having at least one hole for receiving the pin means so as to engage the cylinder.

25. A trailer for use on a road or other underlying surface, the trailer comprising a frame including a forward section and a rearward section laterally spaced apart from the forward section, a middle section received between the forward and rearward sections, the middle section having at least a first position elevated above the underlying surface, and a second position elevated above the first position, support elements fixed to and extending downward from the forward and rearward sections for supporting the middle section at the prescribed positions, the supporting elements including forward and rearward facing surfaces, roller assemblies on the middle section for guiding the middle section from one of the positions to another of the positions linearly along the forward and rearward facing surfaces of the support elements, the roller assemblies engaging the forward facing surface of the forward section support elements comprising a roller, an axle for supporting the roller, a sleeve fixed to the middle section, a cylinder slidably received within the sleeve, an end plate fixed to one end of the cylinder, the axle being fixed to the end plate to project the roller outside said one end of the cylinder, and means for withdrawing the cylinder in a direction parallel to the axle to permit the separation of the forward section from the middle section and allow front loading of the trailer middle section.

26. The trailer of claim 25 wherein the means for withdrawing the axle comprises a removable pin means holding the sleeve within the cylinder and handle means coupled to the sleeve for handling the assembly upon removal of the pin means.

* * * * *